United States Patent Office 3,118,965
Patented Jan. 21, 1964

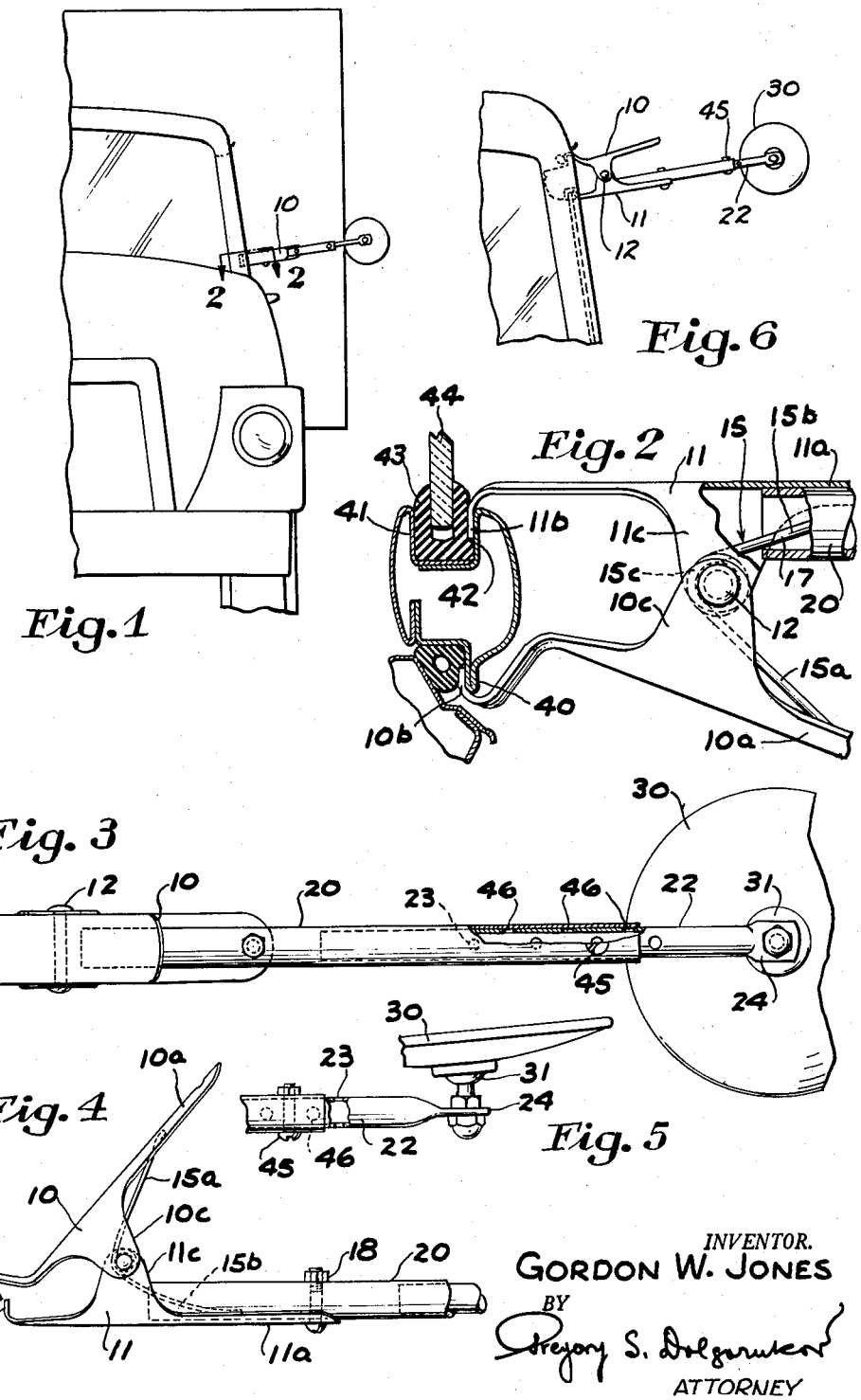

3,118,965
REAR VIEW MIRROR DEVICE
Gordon W. Jones, 2972 Seebaldt, Drayton Plains, Mich.
Filed June 24, 1960, Ser. No. 38,540
6 Claims. (Cl. 88—93)

This invention relates to rear view mirror devices for motor vehicles and more particularly to such devices of the long arm type, such as used on trucks and on passenger automobiles operated with trailers.

Use of rear view mirrors extending outwardly from the vehicle is of great importance in connection with such vehicles, since the operators thereof are unable to see rearwardly because of the trailer's obscuring the rear view completely.

Because of the increased size of freight trailers, as well as house trailers, it is now necessary for safe driving to have a rear view mirror device provided not only on the left hand side of the operator of the vehicle but also on the right hand side thereof in order to observe clearance of the trailer with respect to the sidewalk, automobiles parked thereat, and also in turning around corners. Such applications of rear view mirror devices present a number of difficult problems with respect to their construction which do not exist in the use of such devices used on passenger motor vehicles.

A rear view mirror device used on a motor vehicle having a trailer must extend sidewise to have its reflecting mirror beyond the projected outline of the trailer, both on the left hand side as well as on the right hand side of the tractor vehicle. Because of such a requirement, the bracket or arm on which the reflecting mirror is mounted must necessarily be sufficiently long and protrude outwardly as much as 16"–18" from each side of the vehicle. With trucks now being operated over expressways at high speeds and the reflecting mirrors being of considerable size, they present considerable wind resistance and their mounting must be such as to resist considerable force exerted at their mirror ends. As a result, many long arm mirrors have mounting brackets of the double leg type to produce sufficient resisting moment and to decrease the danger of the mounting bracket, usually secured with the aid of screws engaging threaded holes in relatively thin sheet metal, being torn out. Many such devices satisfying the above requirements can be installed only at one side of the vehicle. In other words, the right hand mirror device may not be suitable for mounting on the right hand side of the vehicle, and vice versa. Furthermore, with varying types of tractor vehicles and trucks, the elevation of the reflecting mirror is determined definitely by the dimensions of the arm and the place on the vehicle body at which it has to be installed, with very little or even no variation being permissible with respect to the height of the reflecting mirror to suit the particular requirements. On the other hand, such requirements are varying, since they are determined by the dimensional specifications of the vehicle as well as the physical characteristics of the operator thereof.

Installing such mirror devices usually requires shop facilities for marking the location of the holes as well as drilling and tapping such holes. Even detaching such devices from the vehicles requires use of tools. The almost universal method of installing such devices on screws leaves irreparable changes in the vehicle such as a number of tapped holes. Moreover, loosening of the screws because of operational vibrations often results in loss of the rear view mirror device on the road. With such occurrences, unless a spare device is immediately available, driving without one presents serious danger and may delay or interrupt a trip or use of the vehicle. It should be appreciated that even a relatively short relay in the operation of a large loaded truck presents considerable loss by disrupting schedules and increasing the overhead. A particularly secure attachment of long arm mirrors, while eliminating the above difficulties, may introduce new problems, particularly in cases of passenger motor vehicles used with trailers. It can be easily appreciated that while a long arm mirror on both sides of such passenger vehicle is necessary when the vehicle is operated with a trailer, as soon as the trailer is disconnected, the presence of such long arm mirrors, particularly on the right hand side of the vehicle, presents considerable danger to pedestrians on the sidewalk as well as to parked vehicles. Furthermore, such long arm mirrors on the left hand side of the vehicle may be hit and knocked off by overtaking vehicles. However, unless a long arm rear view mirror device is detachable in a matter of a few seconds and without the use of tools, it offers a temptation to take a short trip without removing it and thus presents the above dangers.

One of the objects of the present invention is to provide an improved rear view mirror device whereby the above difficulties and disadvantages are overcome and largely eliminated without introducing new problems or appreciably increasing the costs involved.

Another object of the invention is to provide an improved rear view mirror device of the long arm type which can be attached either to the left side or the right side of the vehicle, such attachment and detachment being done in a matter of a few seconds, without the use of any shop facilities or even hand tools, and without leaving any irreparable changes, such as holes, in the vehicle structure.

A further object of the invention is to provide an improved rear view mirror device which can be attached at any height on the vehicle door structure and both on the vertically extending as well as the horizontally extending edges thereof.

A further object of the present invention is to provide an improved rear view mirror device which is held in place by strong resilient means and, therefore, does not develop any rattles and virtually eliminates the possibility of being lost.

A still further object of the present invention is to provide an improved rear view mirror device including attachment means enabling the device to withstand strong air resistance forces acting longitudinally of the vehicles, as well as forces tending to twist its attaching bracket, and yet in which the attaching means are such that more than one such rear view mirror device can be attached on either side of the vehicle without interference with each other.

A still further object of the present invention is to provide an improved rear view mirror device which is attachable to the window frame of the vehicle door in a resilient and secure manner and without interference with operating of the sliding glass panel in such frame.

A still further object of the present invention is to provide an improved rear view mirror device of the long arm type including attachment means of such a construction that the device can be attached to virtually any motor vehicle in spite of changes in the dimensional and constructional specifications thereof.

It is an added object of the present invention to provide an improved rear view mirror device of the foregoing nature which is exceedingly simple in construction, dependable in operation and is relatively inexpensive to manufacture.

Further objects and advantages of this invention will be apparent from the following description and appended claims, reference being had to the accompanying drawings forming a part of this specification, wherein like reference characters designate corresponding parts in the several views.

FIG. 1 is a front view of a truck having mounted on its door a rear view mirror device embodying the present invention.

FIG. 2 is a fragmentary sectional view taken in the direction of the arrows on the section plane passing through the line 2—2 of FIG. 1.

FIG. 3 is a top view of the rear view mirror device of FIG. 1, shown separately.

FIG. 4 is a top view showing the left hand portion of the device of FIG. 3.

FIG. 5 is a view similar in part to FIG. 4 but showing the right hand side of the device of FIG. 3.

FIG. 6 is a view similar in part to FIG. 1 but showing the rear view mirror device embodying the present invention attached to the top edge of the door instead of the front edge thereof.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In the drawings there is shown, by way of example, an improved rear view mirror device embodying the present invention. Referring particularly to the drawing, the device illustrated therein comprises a hinged spring clamp including members 10 and 11 hinged as indicated at 12. Each of said members 10 and 11 comprises a handle such as 10a and 11a, at one of its ends and a jaw such as 10b and 11b at its opposite end. Intermediate of said ends there are provided transversely extending tongues 10c and 11c at which said members are hinged at 12, as mentioned. In order to urge jaws 10b and 11b together, there is provided a spring 15 having a helical portion 15c mounted on the hinge 12 and ends 15a and 15b acting on the handles 10a and 11a, respectively, urging said handles apart. To the handle 11a there is secured in any suitable manner such as with the aid of a bolt 18 a tubular arm 20 with the end 15b of the spring being housed within the end of said tubular arm 20. The tube 20 is of elongated shape and extends outwardly for a distance sufficient to bring the mirror 21 mounted at its opposite end to the position such as shown in FIG. 1.

The opposite end of the arm 20 may be made of a telescoping construction, as shown, and includes a second tubular member 22 sliding within the tube 20 and provided with a plurality of holes 23 to permit longitudinal adjustment of the composite arm formed by said telescoping tubular members 20 and 22. The free end of the tubular member 22 is flattened as shown at 24 and is adapted to receive a mirror 30 of any suitable shape, a ball-and-socket joint 31 being operatively interposed between the tubular member 22 and the mirror 30 for the purpose of adjustment of the mirror 30 in a manner well known in the art.

The spring clamp is made preferably from sheet metal by stamping operations, and its relatively wide jaws are stiffened with the aid of central beads, as illustrated. The tips of the jaw are flat and are bent to form hooks adapted to engage the window frame such as are provided in the doors of motor vehicles. Such a window frame usually includes a lip 40 extending along the peripheral edges of the door, and a channel such as one formed in the illustrated construction by the angular members 41 and 42, with said channel adapted to receive a weather strip 43 usually made of rubber and having a window pane or panel 44 slidable therein in a manner well known in the art. In the installed position of my rear view mirror device one of the jaw hooks engages the peripheral lip 40 while the other engages the side 42 of the channel extending between said side 42 and the rubber member 43. As can be seen from examination of FIG. 2, such attachment of the spring clamp does not interfere either with the operation of the glass panel 44 or with closing of the door.

It will now be seen in view of the foregoing that in the installed position of the device one of the handles is free and can be grasped for manually operating the clamp in attaching and detaching the same from the door. The device may be attached to the vertically extending front edge of the window frame at any height thereof, as well as to the upper peripheral edge of the door as shown in FIG. 6. Two devices may be used in such positions, if desired.

For attaching the device in the position illustrated in FIG. 6, the mirror 21 and the bar 22 have to be turned through a 90° angle which can be done by removal of the bolt 45, turning the tube 22 within the tube 20, and passing said bolt 45 through one of the holes 46 provided in the member 22.

It will be understood that the jaws of the spring clamp may be bent to the shape illustrated for their shape may be different depending upon the construction of the doors of the vehicle for which the device is intended. Furthermore, the tubular arm such as 20 may be secured to either of the two handles of the clamp, and the device may be attached with either of the jaws forward to produce the desired positioning of the mirror. Obviously, with the device installed to have the handle to which the tube 20 is attached disposed forwardly will bring the mirror further forward. Bending of the jaws in a way to have the handles in the attached position of the device extend substantially parallel or at some desired angle may be used for the purpose of providing additional adjustments.

It will now be seen in view of the foregoing that my improved rear view mirror device can be attached or detached to or from a vehicle in a matter of seconds only, without the use of any tools, and be disposed at any desired position on the window frame of the door and adjusted accordingly, both with respect to the length of the arm as well as the position of the mirror 21 thereat. The device is exceedingly simple to manufacture and, therefore, is much less expensive than the conventional devices which, in spite of their increased cost, have many disadvantages discussed above.

By virtue of the above disclosed construction, the objects of the invention listed above and numerous additional advantages are attained.

I claim:

1. A detachable rear view mirror device for motor vehicles including a door having a window, with the structure of the door forming a frame for said window and having an outwardly extending lip at its peripheral edge, said device comprising a hinge spring clamp having two handles at one of its ends and two jaws at its opposite end, and a spring acting on said handles to urge said jaws together, said jaws being shaped to engage the door structure selectively along the horizontally as well as along the vertically extending portions of said edge; an elongated tubular arm having one end secured to one of the handles of said clamp, with the other handle of the clamp remaining free for manually operating the clamp, and a mirror adjustably mounted on the other end of said arm.

2. The invention defined in claim 1, with the arm being of the telescoping type for adjustably varying its length.

3. The invention defined in claim 1, with the arm being of the telescoping type with its telescoping members rotatable with respect to each other for adjusting the mirror in two positions at 90° angles to each other.

4. A detachable rear view mirror device for motor vehicles including a door having a window frame carrying a resilient channel with a glass panel slidable therein and having a peripheral edge provided with a resilient weather strip, said device comprising a hinge clamp having two handles at one of its ends and two jaws at its opposite end and a spring acting on said handles to urge said jaws together; an elongated arm having one end secured to one of the handles of the clamp, with the other handle of the clamp remaining free for manually operating the clamp for attaching and detaching the device; and a mirror mounted on the other end of said arm; a ball-and-socket joint operatively interposed between said mirror and said arm; the jaws of said clamp being adapted to grasp the window frame and said peripheral edge on the outside of said resilient channel and said weather strip for supporting the device thereon in a position to be observed from the operator's seat.

5. The invention defined in claim 4, with the clamp being of sheet metal construction and having flat jaws with their ends bent to a hook-like shape, the width of said jaw being sufficiently large to ensure angular stability of the device in its installed position.

6. A detachable rear view mirror device for motor vehicles including a door having a lip provided at its peripheral edge, and a channel at its window frame, said channel holding a resilient weather member for glass pane sliding therein, said device comprising a tubular arm having one end adapted to receive a mirror, a mirror mounted on said end with a ball-and-socket joint being interposed between said end and said mirror, a hinge type spring clamp having two handles at one of its ends and two jaws at its other end and a spring acting on said handles to urge them in the direction to keep said jaws closed, one of said jaws being bent to engage the lip provided on said door selectively along the horizontal as well as the vertical portions of the lip, with the other lip bent to engage the outer side of said channel between the rubber member and said side, with the opposite end of the arm being secured to one of the handles of said clamp, whereby attachment of the device to the door does not interfere with the operation of the glass pane and with opening and closing the door.

References Cited in the file of this patent
UNITED STATES PATENTS

| | | |
|---|---|---|
| 392,466 | Shurtleff | Nov. 6, 1888 |
| 2,333,671 | Peters et al. | Nov. 9, 1943 |
| 2,565,012 | Barrett | Aug. 21, 1951 |
| 2,573,443 | Holland | Oct. 30, 1951 |